United States Patent

Neri et al.

[11] 3,901,939
[45] Aug. 26, 1975

[54] PROCESS FOR THE PREPARATION OF ORGANIC COMPOUNDS

[75] Inventors: Carlo Neri; Emilio Perrotti, both of San Donato Milanese, Italy

[73] Assignee: Snam Progetti S.p.A., Milan, Italy

[22] Filed: Sept. 26, 1973

[21] Appl. No.: 400,791

Related U.S. Application Data

[63] Continuation of Ser. No. 102,976, Dec. 30, 1970, abandoned.

[30] Foreign Application Priority Data

Dec. 10, 1969  Italy................................. 26426/69

[52] U.S. Cl. ................. 260/465.8 R; 260/346.1 R; 260/439 R; 260/465.8 D; 260/593 R; 260/601 R; 260/644
[51] Int. Cl.² ............... C07C 120/00; C07C 76/02; C07C 49/04; C07C 47/02
[58] Field of Search ........ 260/465.8 D, 439, 593 R, 260/10.74, 465.8 R, 601 R, 644

[56] References Cited
UNITED STATES PATENTS

| 3,225,082 | 12/1965 | McClure | 260/465.8 D |
| 3,444,235 | 5/1969 | Chabardes et al. | 260/465.8 D |
| 3,539,606 | 11/1970 | Murdoch et al. | 260/464 |
| 3,562,181 | 2/1971 | Linn et al. | 260/465.8 D |
| 3,562,311 | 2/1971 | McClure | 260/465.8 D |

*Primary Examiner*—Joseph P. Brust
*Attorney, Agent, or Firm*—Ralph M. Watson Esq.

[57] ABSTRACT

A process for preparing dimerization products having the formula $X — (A)_2 — X$ in which A is a divalent radical such as $—CH_2—$, and X is a functional group such as $—NO_2$, wherein a trivalent cobalt insertion product represented by the formula:

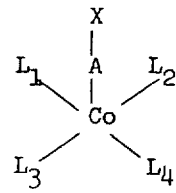

wherein $L_1, L_2, L_3$ and $L_4$ may belong to the same ligand molecule, e.g., a planar tetradentate ligand such as bis-(diacetyl-monoximeimino)-propane, or to two molecules or a bidentate ligand such as o-phenanthroline, or may be four monodentate ligands and A and X have a significance given above, is pyrolized in an inert atmosphere.

9 Claims, No Drawings

PROCESS FOR THE PREPARATION OF ORGANIC COMPOUNDS

This is a continuation of application Ser. No. 102,976, filed Dec. 30, 1970, now abandoned.

The present invention refers to a process for the preparation of organic compounds. More particularly it refers to a process for the dimerization of molecules so as to produce useful dimer products.

There exist, see U.S. Ser. No. 102,977, filed Dec. 30, 1970 having the same inventors and assignee as this application and issued as U.S. Pat. No. 3,803,192 (Apr. 9, 1974), trivalent cobalt insertion products having the general formula

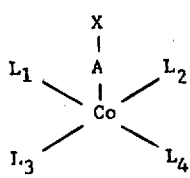

wherein $L_1$, $L_2$, $L_3$ and $L_4$ may belong to the same ligand molecule, for example a planar tetradentate ligand as bis-diacetylmonox imeimino)-propane, bis-(salicyl-aldehyde)-ethylenediamine, or bis-(acetylacetone)-ethylenediamine; or may be selected from o-phenanthroline, 2-2' dipyridyl, nitroketones, acetylacetone, o-nitrosophenol, bidentate Schiff bases of the formula

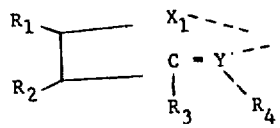

wherein $R_1$, $R_2$, $R_3$ and $R_4$ may be hydrogen, substituted and unsubstituted alkyl or aryl radicals, $X_1$ may be oxygen, sulphur or nitrogen, Y is nitrogen; or they may be four monodentate ligands, the same or different, such as nitriles, amines, phosphines, thioalcohols, nitrocompounds, halogen ions and so on; A is a divalent radical selected from unsubstituted and substituted alkylene

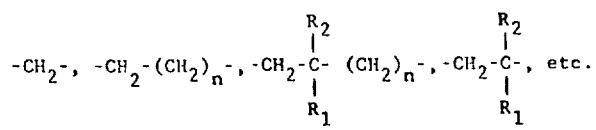

or a substituted radical as

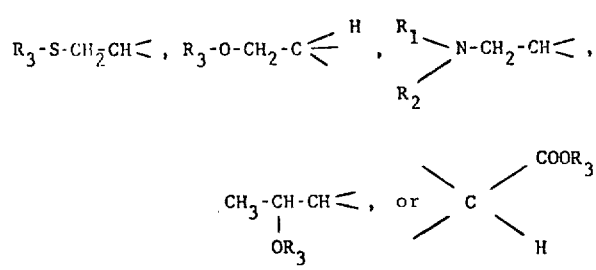

wherein each of said $R_1$, $R_2$ and $R_3$ may be hydrogen or aryl and alkyl radicals, and X is a functional group such as $NO_2$, —CN, $CH_3CO$, —CHO, etc. It has now been found, that these trivalent cobalt derivatives undergo a homolytic scission thermally according to the following scheme

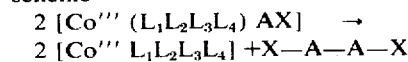

giving rise to divalent cobalt complexes of the formula:

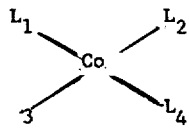

and to the products of the corresponding carbon radicals having the formula X—A—A—X.

Typical examples of this process include the preparation of succinodinitrile from acetonitrile, succinic aldehyde from acetaldehyde, dinitroethane from nitromethane and hexanedione 2,5 from acetone. In the last case, 2,5 dimethylfuran is obtained at percentages lower than the dimerization product.

According to the process of the present invention, the reaction is carried out in an inert atmosphere and at a temperature ranging between 120°C and 200°C, preferably in the range 140° to 160°C. It may be carried out either in the solid state or in presence of inert solvents the boiling points of which are lower than the above-cited temperature values. Said solvents are preferably selected from the aromatic hydrocarbons. The dimerization and rearrangement products are located in the gaseous phase.

The nature of this reaction may be characterized by mass-spectrometry. The controlled pyrolyses of the aforesaid products allows the volatile products of the above reactions to be quantitatively observed and analyzed.

The process of this invention is useful as an organic synthesis tool. Particularly the so obtained dimerization products may be employed as starting compounds in the preparation of polymers and copolymers useful in the synthetic fiber field.

The invention will now be illustrated by the following examples.

EXAMPLE 1

10 mmoles of acetonyl-$Co^{+3}$-Salen, in 50 cc of anhydrous benzene, were heated at 140°C for 20–30 minutes in a closed vessel. The reaction could be visually controlled by the mixture colour change from green to red. At the end of the reaction $Co^{+3}$-Salen was quantitatively separated by cooling; the reaction products were isolated from the solution by means of the usual methods.

The gas-chromatography analyses of the solution showed the formation of 3.6 mmoles of hexanedione 2-5 and 0.7 mmoles of 2-5 dimethylfuran owing to the intramolecular cyclization of the first product, the analyses having been compared with the ones of standard solutions having a known titre.

The total yield of this transformation was 85% with respect to the starting complex.

EXAMPLE 2

10 mmoles of cyano-methylene-$Co^{+3}$-Salen were treated in the same working conditions of the preceding example for 50–60 minutes. After filtration of the reduced complex the benzene solution was analyzed by gas-chromatography and compared to standard solutions; it showed the presence of succinodinitrile in an amount of 3.2 mmoles at a total yield of 64%. The dinitrile, separated by gas-chromatography, showed an I.R. spectrum coinciding with a standard.

What we claim is:

1. A process for the homolytic scission of trivalent cobalt complexes into useful dimerization products which comprises heating a trivalent cobalt complex having the formula:

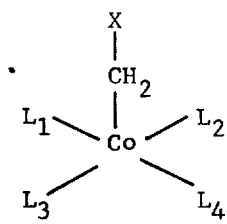

wherein $L_1$, $L_2$, $L_3$ and $L_4$, when taken together, derive from a tetradentate ligand selected from bis-(diacetylmonoximeimino) propane, bis-(salicyl aldehyde) ethylenediamine or bis-(acetylacetone) ethylenediamine; and X is $NO_2$, CN, $CH_3CO$ or CHO; in an inert atmosphere at a temperature of from 120°C to 200°C to produce compounds of the formula:

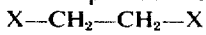
$$X-CH_2-CH_2-X$$
wherein X is as defined above.

2. A process according to claim 1 wherein said trivalent cobalt complex is derived from bis-(salicylaldehyde) ethylenediamine.

3. A process according to claim 1 wherein said trivalent cobalt complex is derived from bis-(salicylaldehyde) ethylene diamine and X is CN or $CH_3CO$.

4. A process according to claim 3 wherein X is CN and $X-CH_2-CH_2-X$ is $CN-CH_2CH_2CN$.

5. A process according to claim 3 wherein X is $CH_3CO$ and $X-CH_2CH_2-X$ is $CH_3CO-CH_2CH_2-CO-CH_3$.

6. A process according to claim 1 wherein the temperature is about 140°C to 160°C.

7. A process according to claim 1 wherein the reaction is carried out in the presence of an inert solvent.

8. A process according to claim 7 wherein said inert solvent is an aromatic hydrocarbon.

9. A process according to claim 8 wherein said aromatic hydrocarbon is benzene.

* * * * *